(No Model.) 4 Sheets—Sheet 3.

R. G. WARD.
MACHINE FOR PRODUCING ARTIFICIAL FREEZING AND REFRIGERATION.

No. 443,020. Patented Dec. 16, 1890.

WITNESSES:
L. C. Hill
W. S. Duvall

INVENTOR
R. G. Ward
BY
E. B. Stocking
ATTORNEY

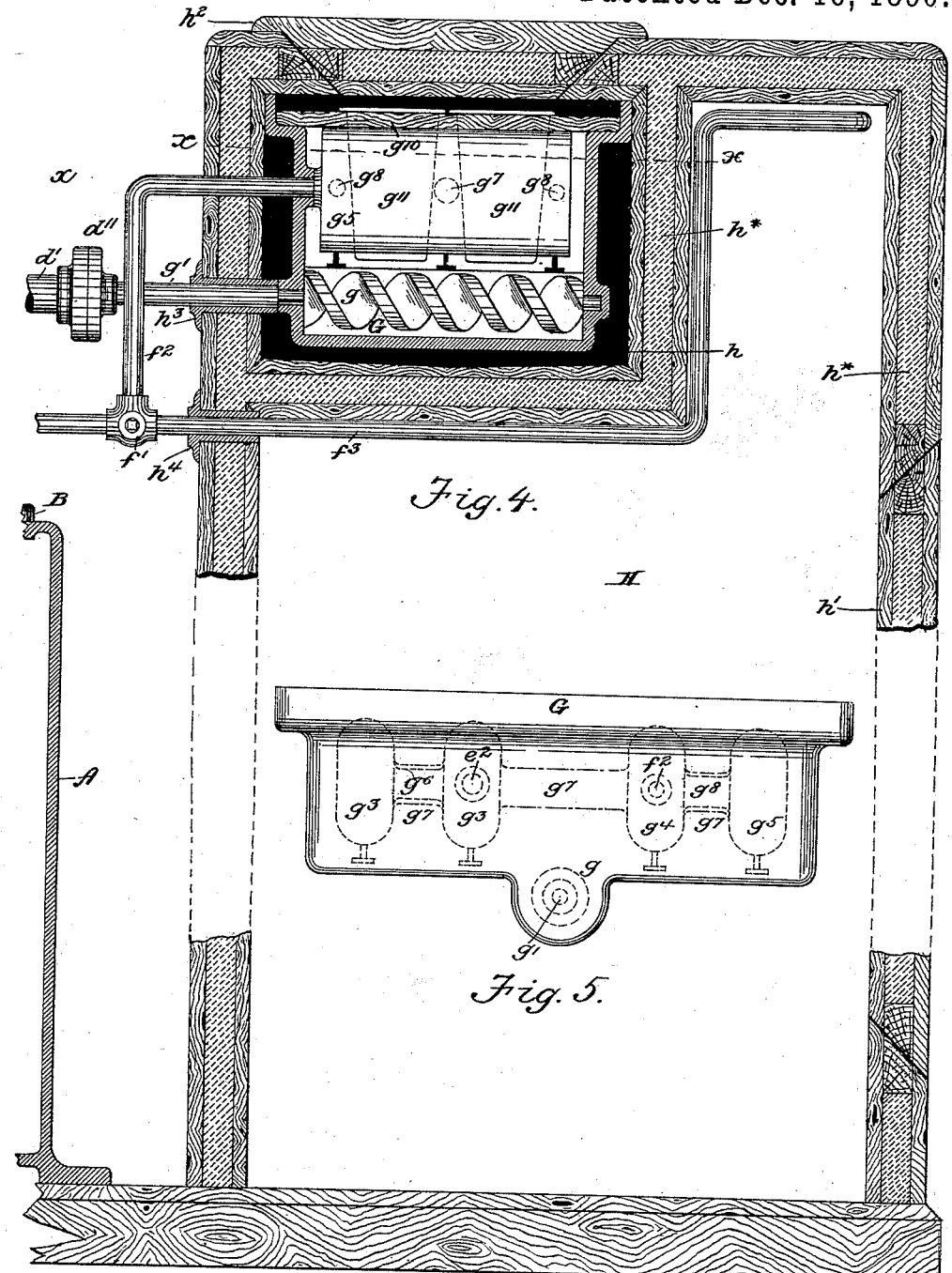

UNITED STATES PATENT OFFICE.

RANDOLPH G. WARD, OF BALTIMORE, MARYLAND.

MACHINE FOR PRODUCING ARTIFICIAL FREEZING AND REFRIGERATION.

SPECIFICATION forming part of Letters Patent No. 443,020, dated December 16, 1890.

Application filed December 15, 1888. Serial No. 293,761. (No model.)

*To all whom it may concern:*

Be it known that I, RANDOLPH G. WARD, a citizen of the United States, residing at Baltimore, in the State of Maryland, have invented certain new and useful Improvements in Machines for Producing Artificial Refrigeration and Freezing, of which the following is a specification, reference being had therein to the accompanying drawings.

This invention particularly relates to that class of machines which may be operated under isolated conditions, making it adaptable to private buildings, public institutions, hotels, steamboats, soda-fountains, dairies, candy-factories, grocery and meat stores, &c.; and it is especially adapted to light high-speed powers, such as water and electric motors. It is also designed to accomplish maximum results with minimum power and attention, and while the machine illustrated is intended to freeze and refrigerate simultaneously or separately, as desired, it is not absolutely necessary that it should accomplish both, as the machine may be attached to a simple freezer or refrigerator, and not to a combined apparatus, as shown in Figure 4, which under certain conditions might be unnecessary. I accomplish these results by means of the machine illustrated in the attached drawings, in which is employed any well-known volatile gas, such as anhydrous ammonia, sulphurous oxide or methylic ether.

Other objects and advantages of the invention will hereinafter appear, and the novel features thereof will be particularly pointed out in the claims.

Figure 1:
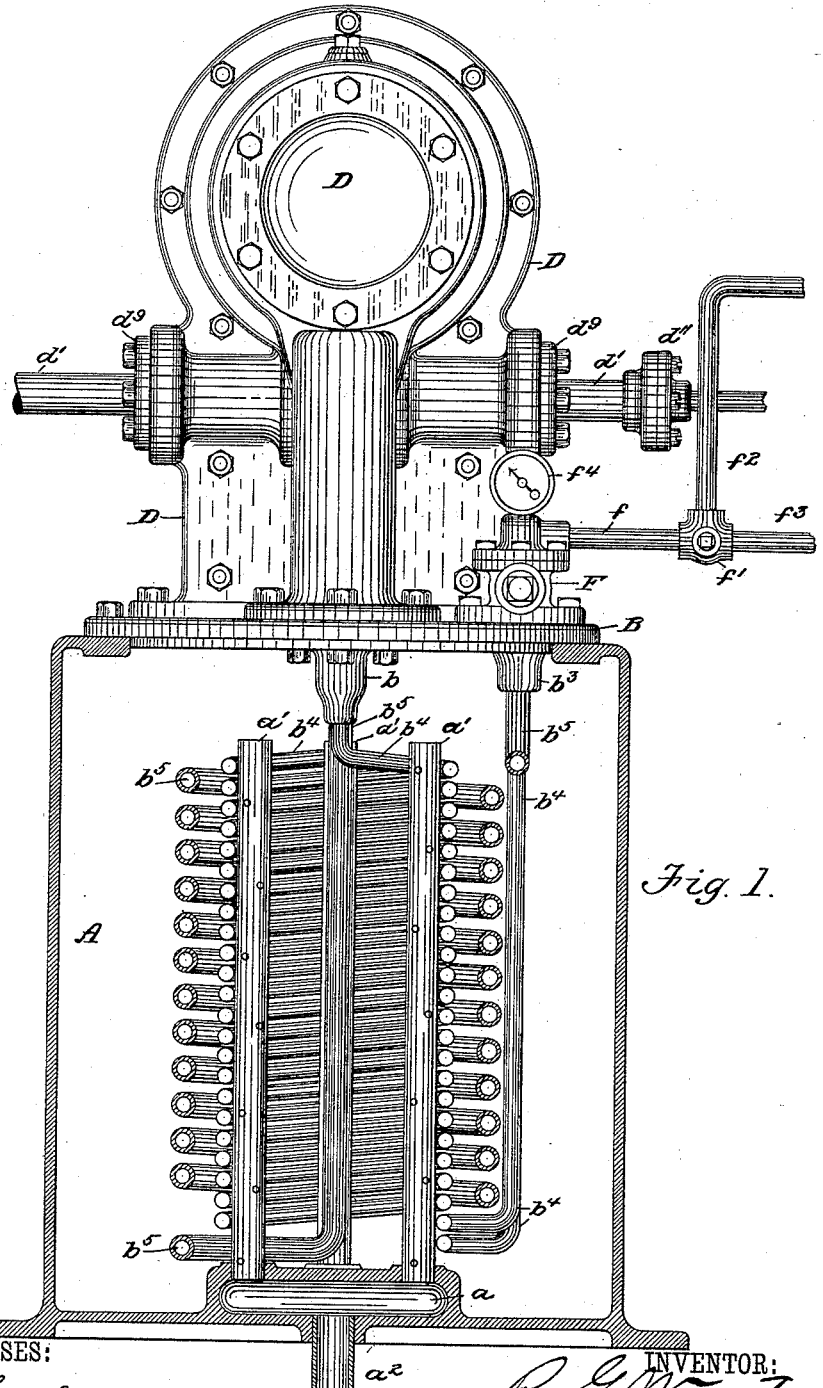
Figure 2:
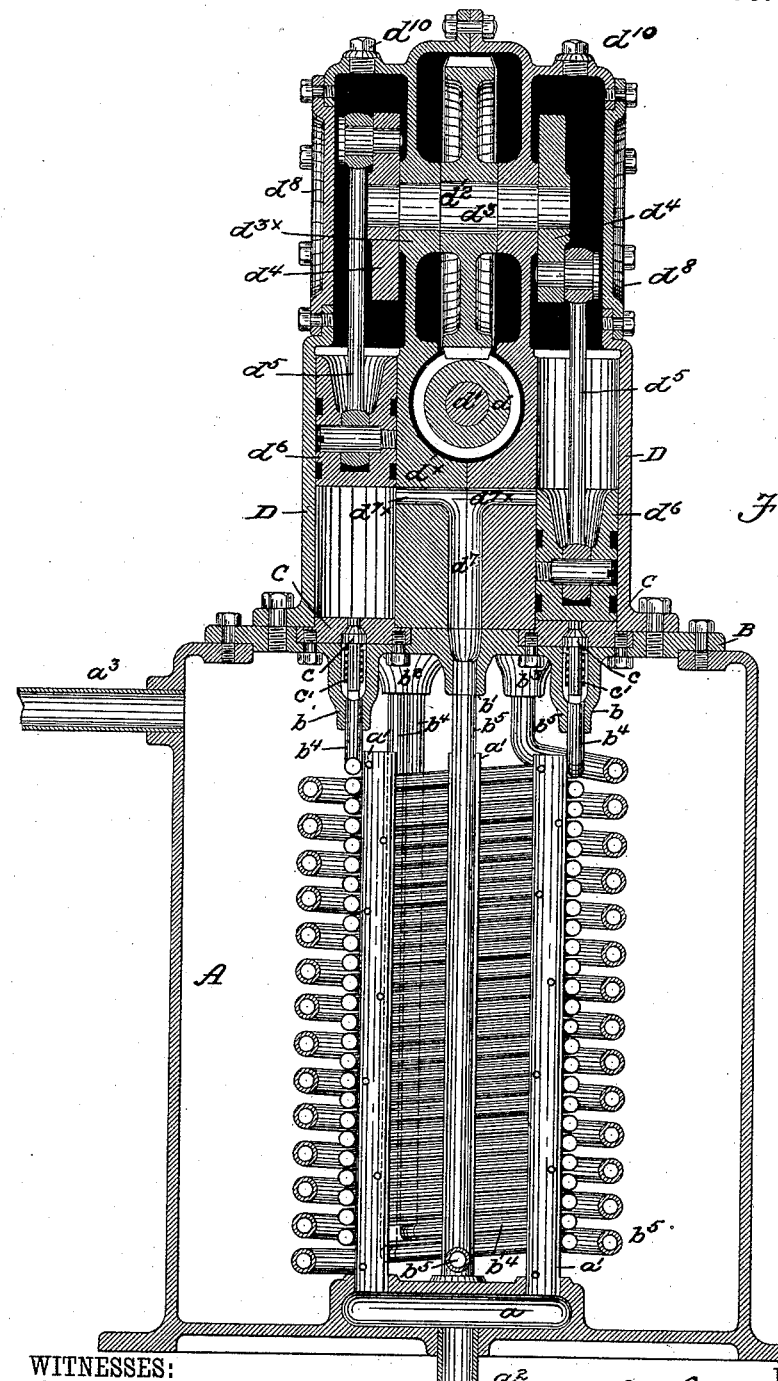
Figure 3:
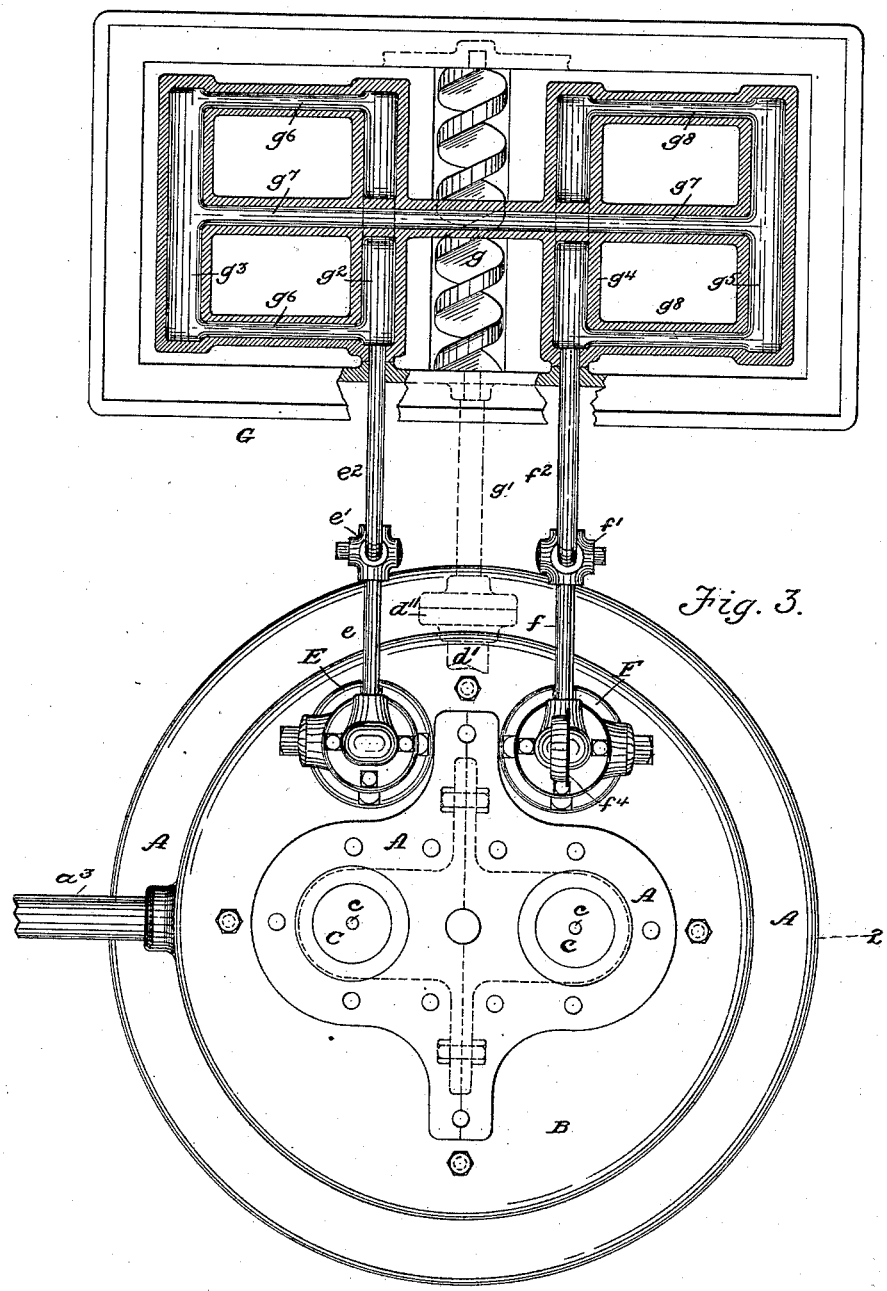

Referring to the drawings, Fig. 1 is an elevation, the tank and the coils therein being in section. Fig. 2 is a vertical section of Fig. 1, taken on a line at a right angle to that of the sectional part of Fig. 1. Fig. 3 is a plan of the tank and the mechanism mounted thereon, with a horizontal section of the freezing-tank, the section being on the line $x$, Fig. 4, showing the expanding-chambers and system of circulation. Fig. 4 is a vertical section of the freezing and refrigerating chamber, with the pipe-connections in side elevation and with a portion of the adjacent tank in section; and Fig. 5 is an end elevation of the freezing-tank, the position of the agitator and expanding or absorbing chambers being shown by dotted lines.

Like letters of reference indicate like parts in all the figures of the drawings.

In describing my invention, A represents a cylindrical vertical metallic tank, having suitable flanges at its base to give it steadiness.

$a$ is a cored boss or chamber, into which are fixed upon the inside of the tank the four vertical stand-pipes $a'$, and upon the under or outer side the feed-pipe $a^2$.

$a^3$ is a discharge-pipe suitably fitted into the upper edge of the tank A.

B is a base-plate or tank-head, forming the head of the tank A and the base of the pumps D, from the lower side of which base-plate extend the teats $b$, $b$, $b'$, $b^2$, and $b^3$. To the teats $b$ and $b$ are attached the ends of the condensing-coils $b^4$, which, after coiling in an interlacing and downward direction, return in a standing vertical direction and enter the teat $b^2$. To the teat $b^3$ is attached the larger absorbing-coil $b^5$, which also coils in a downward direction and returns in a vertical standing-pipe entering the plate B through the teat $b'$, and thence through an orifice or core $d^7$, branching, as at $d^{7x}$, into the pump-chamber.

C C are two plates counterbored in and suitably bolted to the plate B, forming the valve-seats and the pump joint-heads. The valves $c$ $c$ have their seats in the under sides or faces of the plates C C, being supported thereto by the coil-springs $c'$ $c'$, which encircle the stems of the valves $c$ $c$ and rest in suitable bores made in the teats $b$ $b$.

D D are the two half cases or castings, which, when bolted together in the manner shown in Figs. 1 and 2, constitute the main shell or frame of the two-cylinder single-acting compression-pumps employed in my device for compressing and circulating the vapor employed as the cooling medium.

$d$ is a worm upon the shaft $d'$, to one end of which is applied the power, while to the other, as shown in Figs. 1, 3, and 4, is coupled the agitator-shaft.

$d^2$ is a worm-wheel propelled by the worm $d$ upon the shaft $d'$.

$d^3$ is the main shaft, having upon its outer extremities the cranks $d^4$, to which are attached the connecting-rods $d^5$, by which the pistons $d^6$ are caused to reciprocate.

$d^7$ is a T-shaped core having branches or openings $d^{7\times}$ into each cylinder at the upper limit of its stroke, and through which the vapor is drawn into the chambers of the pumps.

$d^8$ are face-plates for giving access to the pumps.

$d^9$ are stuffing-boxes to prevent the escape of oil from the worm-chambers.

$d^{10}$ are oil-plugs to enable the machine to be oiled.

$d^{11}$ is an ordinary plate shaft-coupling.

The worm $d$ is lubricated by being embedded in oil put into the chamber in which the worm rotates.

E, Fig. 3, is the check-valve which regulates the volume of circulation through the freezing and refrigerating chambers.

$e$ is the lead pipe connecting the valve E with the three-way cock $e'$, the purpose and object of which being to adjust the relative amounts of liquids or vapor flowing through the freezing-chamber lead pipe $e^2$ and the refrigerating lead pipe $e^3$ just below the same. (See corresponding side elevation of absorbing-pipes $f^2$ and $f^3$, Figs. 1 and 4.)

F is the check-valve; $f$, the lead pipe connecting the valve F with the three-way cock $f'$, the purpose of which cock is to make it possible to so adjust the absorbing force of the pumps as to produce the desired effects upon the freezing and refrigerating chambers corresponding to the adjustment of the cock $e'$, just described.

G is a metallic tank, of any suitable form, but preferably that shown, having in a suitable offset in its bottom the anti-freezing liquid-agitating worm $g$, propelled by the shaft $g'$, connected with the shaft $d'$, and the coupling $d^{11}$, as shown in Figs. 3 and 4.

$g^2$, $g^3$, $g^4$, and $g^5$ are oval-shaped oblong expanding-chambers connected, as shown in Figs. 3, 4, and 5, by means of the pipes $g^6$, $g^7$, and $g^8$, the purpose and object of this system of expanding-chambers and pipe-circulating connections being to throw the least effective expander $g^4$ contiguous to the most effective expander $g^2$, and thus maintain an equilibrium of working results.

H is a refrigerator having the combined freezing-chamber $h$, a suitable refrigerator-door $h'$, and a suitable freezing-chamber door $h^2$; the refrigerator-coil entering the chamber by pipe $e^3$ and circulating or zigzagging through the chamber in any manner which may be desired, and passing out of the same by pipe $f^3$. (See Fig. 4.)

$g^{10}$ is a board covering the tank G, but having holes perforated through it, in which are suspended the cans $g^{11}$, containing the water or other substance to be frozen.

$h^3$ and $h^4$ are glands for passing the pipes and shafts through the walls of the refrigerator into the chambers.

I will describe my machine as if it were driven by a water-motor. The city mains are attached to the pipe $a^2$, the water freely passes through the core $a$, and the perforated standpipes $a'$, through and around the coils $b^4$ and $b^5$ and up against the under side of the pump-base plate B, cooling the coils and the plate, and passing from the tank A through the pipe $a^3$ to the motor which it drives, and which in turn drives the pumps of the machine. The pumps being set in motion, all air is exhausted from the pipes, coils, and expanding-chambers. The coils $b^4$ are then pumped full of pure volatile gas and the operation of refrigeration is ready to begin. A small portion of the liquid gas is allowed to pass into the freezing-coils through the valve E, the proportion to each being determined by the cock $e'$. There being a vacuum in these coils or chambers, the gas vaporizes, and after absorbing a portion of the heat from the several chambers it is drawn off through the pipes $f^2$ and $f^3$. Thence through the valve F and coil $b^5$ it goes a second time through the radiating-tank A, where the vapor becomes relieved of a portion of its heat before passing into the pump to be condensed and again circulated through the coils $b^4$ and the refrigerator. The brine or other anti-freezing liquid in the tank G is kept in a constant state of circulation throughout the tank by the worm-shaped agitator in its bottom. It will be seen at once that the position of the pump-cylinders, with their heads and valve-seats situated on and forming the head of the tank A, which is kept constantly filled with water, to a large degree relieves the tendency to heat experienced in all refrigerating-pumps; also that there are no stuffing-boxes exposed to the trying pressure of the gases.

The pump-cylinder D has cast integrally therewith a partition serving as bearings $d^{3\times}$ for the shaft $d^3$, on which the piston-rod-actuating cranks $d^4$ are mounted. It also has one-half of the chamber-walls $d^\times$ for the worm-shaft and one-half the core passage or chamber $d^7$ and $d^{7\times}$, through which liquids are exhausted to be compressed by the pistons. In this manner the supports of the operative parts of the mechanism for reciprocating the pistons of the pumps are self-contained in the pump-cylinder castings, and all parts of said mechanism are accessible without permitting the escape of gases from the machine.

As before indicated, I do not limit my invention to a use of the same when operated by a water-motor supplied with water passing through the tank, as described, as it is apparent that any power may be connected with the shaft $d'$ to operate the machine. It is also apparent that the pump-cylinders may be headed directly by the base-plate $b$. In other words, that the plates $c$ may be omitted, in which event the valve-seats for the valve $c$ would be formed in the teats $c'$; but the construction illustrated is preferred.

The system of circulation in the freezing-chamber, as clearly illustrated in Fig. 3, possesses the advantage hereinbefore mentioned of bringing the most active and least active portions of the system adjacent to each other, in that the gas entering the system through the pipes $e^3$ into the enlarged expansion-chamber $g^2$ rapidly absorbs heat and passes through the pipes $g^6$ into the enlarged expanding-chamber $g^3$, where it absorbs somewhat less heat on account of that taken up by the gas. It then passes through the pipe $g^7$ into the enlarged expanding-chamber $g^5$, and from thence through the pipes $g^8$ to the final enlarged expanding-chamber $g^4$, where, on account of previous absorptions of heat, it takes up the least quantity, compared with that absorbed at any other point in the system, from which it is exhausted through the pipe $f^3$ back to the machine. In this manner the absorption of heat throughout the entire area of the freezing-chamber is rendered more nearly uniform than when the course of gas throughout the same is direct.

The refrigerator H may be constructed in any well-known manner to render its walls non-conductive by any suitable filling $h^x$, and in this instance I have illustrated the same character of construction in the refrigerating-chamber, so as to render it practically independent of the refrigerator, although mechanically a part of the same. In this manner the lower temperature produced in the freezing-chamber of the refrigerator is prevented from affecting the temperature of the refrigerator proper, whereby a compact combined apparatus is provided for the special uses hereinbefore mentioned.

It is apparent that the mechanical construction of the pump-operating mechanism possesses possibilities of variation to adapt it to motors of different speeds without material change in the relative arrangement and co-operative arrangement of the parts, in that the worm $d$ and worm-wheel $d^2$ may be cut at threads of varying pitch, while their circumferences and relative diameters remain unchanged. For example, with a comparatively slowly-revolving motor the pitch of the worm $d$ can be increased so as to produce the desired speed of reciprocation of the pump-piston.

Although I have thus minutely described the pump which I prefer to use in connection with my double refrigerator, it is to be understood that I do not claim said pump in this application, but reserve the same for an application to be made hereinafter. Any convenient pump may therefore be employed in connection with my freezing and refrigerating system.

What I claim is—

1. In a machine of the class described, a tank having an apertured base provided with an integral interiorly-extending boss, combined with perforated stand-pipes communicating with the interior of the base, and coils surrounding said stand-pipe, substantially as specified.

2. In a machine of the class described, the combination, with a tank having an apertured bottom provided with a chambered boss and a tank-head provided with nipples, of perforated stand-pipes communicating with the chambered boss, and interlacing coils communicating with the nipples, substantially as specified.

3. In a machine of the class described, the combination of the pumps, the tank, the perforated stand-pipe within said tank, interlacing condensing-coils surrounding the stand-pipe, and the absorbing-coil surrounding the condensing-coils, all constructed and arranged substantially as shown and described.

4. In a machine of the class described, the combination, with the pumps, the freezing-chamber, the tank, the stand-pipes within the tank, and the condensing-coils and return-coils within the tank, of pipes leading to and from the tank and coils and communicating with the freezing-chamber, the pipes $f^3$, and the two-way cocks fitted to the same, substantially as specified.

5. In a machine of the class described, the system of distributing or circulating pipes for a freezing-tank, consisting of primary and final expansion-chambers arranged adjacent to each other, secondary expansion-chambers arranged at opposite ends of the system, and a pipe extending from one to the other of said secondary expansion-chambers, substantially as specified.

6. In a machine of the class described, a freezing-chamber provided with two sets of expanding-chambers, and piping for conducting the gas to the inner end of one chamber, thence to the outer end of said chamber, then through the middle of both chambers to the outer end of the second chamber, thence to the inner end of the second chamber, thence back to the machine, substantially as specified.

7. In a machine of the class described, the combination of the freezing-chamber provided with two sets of expansion-chambers, and an agitator within the freezing-chamber between the expansion-chambers, its shaft, the pumps, the worm-shaft for operating the same, and suitable connections between the worm-shaft and the shaft of the agitator, substantially as described.

8. A freezing-chamber provided with two sets of expansion-chambers, a piping for leading the gas over and into the two ends of the chambers of one set, thence through the middle of both sets, and back through the ends of the second set, in combination with a non-freezing medium surrounding said chambers, and an agitator for the same situated between the two sets of expansion-chambers, substantially as described.

In testimony whereof I affix my signature in presence of two witnesses.

RANDOLPH G. WARD.

Witnesses:
E. B. STOCKING,
H. SUTHERLAND.